United States Patent [19]
Sachtler et al.

[11] Patent Number: 5,786,294
[45] Date of Patent: Jul. 28, 1998

[54] CRYSTALLINE MESOPOROUS ZIRCONIA CATALYSTS HAVING STABLE TETRAGONAL PORE WALL STRUCTURE

[75] Inventors: Wolfgang M. H. Sachtler; Yin-Yan Huang, both of Evanston, Ill.

[73] Assignee: Northwestern University

[21] Appl. No.: 644,359

[22] Filed: May 10, 1996

[51] Int. Cl.$^6$ .......................... B01J 27/053; B01J 23/00; B01J 27/043

[52] U.S. Cl. .................. 502/349; 502/217; 502/222; 502/223; 502/308

[58] Field of Search .................. 502/217, 216, 502/222, 223, 308, 313, 325, 326, 327, 328, 329, 330, 331, 332, 333, 334, 335, 336, 339, 349, 351, 162, 167

[56] References Cited

U.S. PATENT DOCUMENTS

| | | | |
|---|---|---|---|
| 5,304,696 | 4/1994 | Khare et al. | 585/668 |
| 5,380,691 | 1/1995 | Popa | 502/170 |
| 5,422,327 | 6/1995 | Soled et al. | 502/242 |
| 5,518,978 | 5/1996 | Flego et al. | 502/222 |

FOREIGN PATENT DOCUMENTS

| | | | |
|---|---|---|---|
| 2071604 | 6/1992 | Canada . | |
| 299-430-A | 7/1987 | European Pat. Off. | 502/167 |
| 2111-616-A | 10/1988 | Japan | 502/167 |

OTHER PUBLICATIONS

"Surface Properties and Catalytic Performance of Novel Mesostrucured Oxides"; F. Schuth; Ber. Bunsenges. Phys. Chem. 99; pp. 1306–1315; No. 11, 1995.

"Surface Properties and Catalytic Performance of Novel Mesostructured Oxides," F. Schuth, Ber. Bensenges. Phys. Chem. 99, pp. 1306–1315, No. 11 (1995).

"Preparation and Characterization of Mesoporous, High Surface Area Zirconium (IV) Oxides," Knowles et al., *J. Chem. Soc. Chem. Commun.*, 1995, pp. 2083–2084.

"Ordered Mesoporous Molecular Sieves Synthetized by a Liquid–Crystal Template Mechanism," Kresge et al., *Nature*, vol. 359, 22 Oct. 1992, pp. 710–712.

"Surfactant Controlled Preparation of Mesostructured Transition–Metal Oxide Compounds," Ciesla et al., *J. Chem. Soc., Chem. Commun.*, 1994, pp. 1387–1388.

"Generalized Synthesis of Periodic Surfactant/Inorganic Composite Materials," Huo et al., *Nature*, vol. 368, 24 Mar. 1994, pp. 317–321.

"Titanium–Containing Mesoporous Molecular Sieves for Catalytic Oxidation of Aromatic Compounds," Tanev et al., *Nature*, 368, 24 Mar. 1994, pp. 321–323.

"A Neutral Templating Route to Mesoporous Sieves," Tanev et al., *Science*, vol. 267, 10 Feb. 1995, pp. 865–867.

"Synthesis of an Ultralarge Pore Titanium Silicate Isomorphous to MCM–41 and its Application as a Catalysts for Selective Oxidation of Hydrocarbons," Corma et al., *J. Chem. Soc. Chem. Commun.*, 1994, pp. 147–148.

"Synthesis of Mesoporous Vanadium Silicate Molecular Sieves," Reddy et al., *J. Chem. Soc., Chem Commun.*, 1994, pp. 1059–1060.

"Cooperative Formation of Inorganic–Organic Interfaces in the Synthesis of Silicate Mesostructures," Monnier et al., *Science*, vol. 261, 3 Sep. 1993, pp. 1299–1303.

"Effect of Surfactant/Silica Molar Ratios on the Formation of Mesoporous Molecular Sieves: Inorganic Mimicry of Surfactant Liquid–Crystal Phases and Mechanistic Implications," Vartuli et al., *Chem. Mater*, 1994, vol. 6, No. 12, pp. 2317–2326.

"Molecular or Supramolecular Templating: Defining the Role of Surfactant Chemistry in the Formation of Microporous and Mesoporous Molecular Sieves," Beck et al., *Chem. Mater*, 1994, vol. 6, No. 10, pp. 1816–1821.

*Primary Examiner*—Glenn Caldarola
*Assistant Examiner*—Thuan D. Dang
*Attorney, Agent, or Firm*—Meinhart, Boerner, Van Deuren, Norris & Rieselbach, s.c.

[57] ABSTRACT

Methods for the preparation of new sulfated mesoporous zirconia materials/catalysts with crystalline pore walls of predominantly tetragonal crystal structure, characterized by nitrogen physisorption measurement, X-ray diffraction, transmission electron microscopy and catalytic tests using n-butane isomerization to iso-butane and alkylation of 1-naphthol with 4-tert-butylstyrene as probe reactions. Sulfate deposition is preferred for the transformation of a mesoporous precursor with amorphous pore walls into a material with crystalline pore walls maintaining the mesoporous characteristics.

20 Claims, 17 Drawing Sheets

CRYSTALLINE MESOPOROUS ZIRCONIA CATALYSTS HAVING STABLE TETRAGONAL PORE WALL STRUCTURE

CONTRACTUAL ORIGIN OF THE INVENTION

The United States Government has rights in this invention pursuant to Grant No. DEFG0287ER13654, from the U.S. Department of Energy to Northwestern University.

BACKGROUND OF THE INVENTION

This invention relates generally to zirconia catalyst materials having a mesoporous morphology and methods for their preparation and, more particularly those materials having tetragonal crystalline pore walls stable at calcination temperatures.

For chemical processes requiring heterogeneous catalysts it is often desirable to have a high density of surface exposed active sites in a given reactor volume. This can be achieved by using porous materials, either as catalysts or as supports for small clusters of a catalytic material. Specific surface areas in the order of several hundred square meters per cubic centimeter are characteristic of many industrial catalysts. For catalytic processes involving large molecular reactants, pore dimensions of greater than 2 nm are required. The International Union of Pure and Applied Chemistry (IUPAC) defines pores having widths in the range of 2 nm to 50 nm as mesopores. In contrast, pores having widths less than 2 nm are defined as micropores. Accordingly, catalysts having pores of such dimension are defined as mesoporous and microporous, respectively, under the IUPAC construct.

Zirconia, $ZrO_2$, has been employed as a catalyst for a variety of processes. It is a material of excellent thermal stability and chemical inertness, its surface has both oxidizing and reducing properties, as well as acidic and basic properties. K. Tanabe, *Mater. Chem. Phys.*, 13, 347 (1985). It has been shown that Cu supported on zirconia is superior to Cu supported on other oxides such as ZnO, $SiO_2$ and $TiO_2$ for the synthesis of methane from $CO/H_2$, $CO_2/H_2$ and $CO+CO_2/H_2$. Y. Amenomiya, *Appl. Catal.*, 30, 57 (1987). In the hydrogenation of $CO_2$ to hydrocarbons, rhodium supported on zirconia has been found to exhibit a higher activity than rhodium supported on classic supports ($Al_2O_3$ and $SiO_2$) or MgO. T. Iizuka, Y. Tanake and K. Tanabe, *J. Catal.*, 76, 1 (1982); T. Iizuka, Y. Tanake and K. Tanabe, *J. Mol. Catal.*, 17, 381 (1982); T. Iizuka, M. Koijima and K. Tanabe, *J. Chem. Soc., Chem. Commun.*, 638 (1983). In the methanation of $CO+H_2$, $Ni/ZrO_2$ has higher selectivity to higher hydrocarbons than $Ni/Al_2O_3$ and $Ni/SiO_2$, there being a high proportion of olefins in the product. L. A. Bruce and J. F. Mathews, *Appl. Catal.*, 4, 353 (1982); L. A. Bruce, G. J. Hope and J. F. Mathews, *Appl. Catal.*, 8, 349 (1983). $Ni/ZrO_2$ is also less sensitive to $H_2S$ than $Ni/Al_2O_3$ and others, R. A. Dalla Betta, A. G. Piken and M. Shelef, *J. Catal.*, 40, 173 (1975). Zirconia is a catalyst superior to $Y_2O_3/Al_2O_3$, $\gamma$-$Al_2O_3$, MgO, $TiO_2$, ZnO in the hydrogenation of aromatic carboxylic acids to the corresponding aldehydes. K. Tanabe and T. Yamaguchi, *Catal. Today*, 20, 185 (1994). Also chromia supported on zirconia is highly active and selective for these hydrogenations. T. Yokoyama, T. Setoyama, N. Fujita, M. Nakajima and T. Maki, *Appl. Catal.*, 88, 149 (1992). Perovskite, a mixed oxide of La, Sr, and Co, supported on zirconia is quite effective as a catalyst for the complete oxidation of propane, the activity being ten times higher than that of unsupported perovskite while $Al_2O_3$ and $SiO_2$ supports have no effect on activity enhancement. T. Yamaguchi, *Catal. Today*, 20, 199 (1994).

In recent years much effort has been expended on the modification of zirconias through surface deposition of sulfate groups. The sulfated zirconia of the prior art is known to be a very active catalyst for the isomerization of alkanes. M. Hino and K. Arata, *J. Chem. Soc., Chem. Commun.*, 851 (1980). Even n-butane, known to be the most difficult alkane to isomerize, can be isomerized to iso-butane using zirconia modified in this manner. K. Arata, *Adv. Catal.*, 37, 165 (1990).

The structure of the pore walls, whether crystalline or amorphous, can be determinative of catalyst stability and/or catalytic activity. With regard to the latter, different crystal geometries or modifications of the same material can give differing results. For instance, the unusual catalytic activity of sulfated zirconia is only manifest for the tetragonal crystal modification, whereas the thermodynamically more stable monoclinic modification has a much lower activity. The differential catalytic activity of sulfated zirconia is so pronounced that it is used advantageously as an analytical tool to detect the presence of the tetragonal crystalline structure.

However, the prior art zirconias and related catalysts have associated with them a number of deficiencies. Most are related to restriction on the chemical systems with which they can be utilized, and result from their microporous nature and/or inherent instability. For instance, the microporous zirconia catalysts of the prior art do not provide readily accessible active sites for the larger molecular substrates. Related mesostructured transition metal oxides, phosphates or sulfides with lamellar, hexagonal or cubic symmetry have been synthesized, but in all cases the structure collapsed when the constructive template was removed. See, U. Ciesla, D. Demuth, R. Leon, P. Petroff, G. Stucky, K. Unger and F. Schüth, *J. Chem. Soc., Chem. Commun.*, 1387 (1994); and Q. Huo, D. I. Margolese, U. Ciesla, D. G. Demuth, P. Feng, T. E. Gier, P. Sieger, A. Firouzi, B. F. Chmelka, F. Schüth and G. D. Stucky, *Chem. Mater.*, 6, 1176 (1994). A surfactant/zirconia composite has also been synthesized. Its X-ray diffraction pattern is similar to that of several well-known silica-alumina sieves having a bulk hexagonal phase at calcination temperatures. However, this composite loses mesoporosity and collapses into a bulk tetragonal phase at calcination temperatures. F. Schüth, *Ber. Bunsenges. Phys. Chem.*, 99, 1306–1315 (1995).

Efforts continue toward the development of a methodology and synthesis of a mesoporous zirconia catalyst having a tetragonal crystalline pore wall structure stable at calcination temperatures. There is a need for such a material and methods for its preparation for application in various catalytic systems and chemical processes.

SUMMARY OF THE INVENTION

Figure 1:
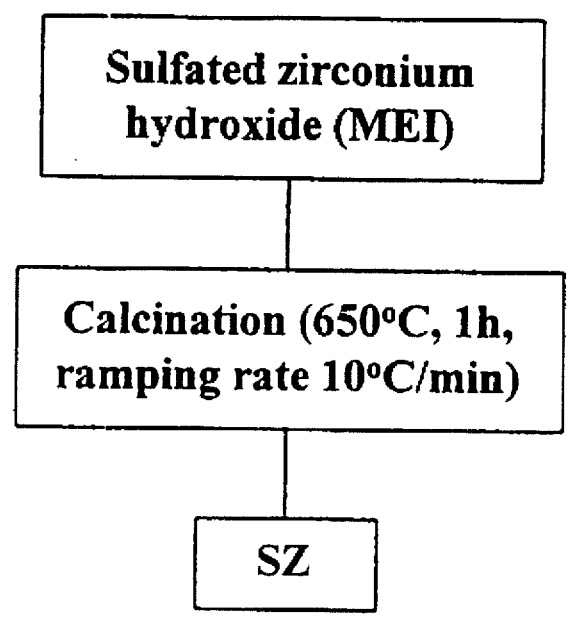
FIG. 1 is a flow chart showing schematically the prior art preparation of microporous sulfated zirconia, SZ.

It is an object of the present invention to provide zirconia catalysts and methods for their preparation, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all instances, to every aspect of this invention. As such, the following objects can be viewed in the alternative with respect to any one aspect of this invention.

It is an object of the present invention to provide various precursors enroute to mesoporous zirconia materials which can be crystallized without losing mesoporous morphology.

It can also be an object of this invention to provide crystalline zirconia materials, useful in a variety of catalytic systems, having a tetragonal crystalline structure.

It can also be an object of this invention to provide crystalline mesoporous zirconia materials which can be used in conjunction with platinum, palladium, rhodium, ruthenium or nickel metals or materials containing such metals, as catalysts to effect synthetic transformations.

It can also be an object of the present invention to provide a zirconia catalyst for use in conjunction with a stabilizing moiety to delay crystallization of the mesoporous walls and/or subsequent delay of the transformation from a tetragonal to a monoclinic modification at calcination temperatures.

It can also be an object of this invention to provide a method of reacting a zirconia precursor to prepare a mesoporous zirconia material and optionally using the mesoporous zirconia to facilitate, catalyze and/or enhance one or more reaction systems.

It can also be an object of the present invention to provide a stabilized mesoporous zirconia active for catalytic interaction with relatively large molecular reactants otherwise unsuitable for systems utilizing microporous zirconia materials.

Other objects, features and advantages of the present invention will be apparent from this summary of the invention and its description of preferred embodiments, and will be readily apparent to those skilled in the art having knowledge of various catalytic systems, zirconia or otherwise, and the requirements for use thereof with various chemical processes and/or catalytic systems. Such objects, features, benefits and advantages will be apparent from the above as taken in conjunction with the accompanying examples, tables, data and all reasonable inferences to be drawn therefrom.

In part, the present invention is catalyst material, including (1) a zirconium dioxide matrix with mesopores having walls with a substantial tetragonal crystalline structure, and (2) a stabilizing chemical moiety disposed on the surface of the matrix. In preferred embodiments, the stabilizing chemical moiety can be prepared from the reaction of the matrix with an ion including but not limited to sulfur oxide, tungsten oxide, molybdenum oxide, yttrium oxide, chromium oxide, nickel oxide, cobalt oxide, copper oxide, vanadium oxide, iron oxide, manganese oxide, zinc oxide or a combination of such ions.

In highly preferred embodiments, the stabilizing chemical moiety is the sulfation product from the reaction of the matrix with sulfuric acid. Regardless of the stabilizing moiety, the catalyst material of this invention can further include a metal supported thereon. The metal can include but is not limited to platinum, ruthenium, palladium, rhodium and nickel.

As mentioned above, the zirconia matrix has a mesoporous morphology. In preferred embodiments, the mesopores of the matrix have a diametral dimension of about 2 nm to about 5 nm, and/or a uniform or monodisperse size distribution. In highly preferred embodiments, the mesopores, whether or not monodispersed, have an irregular or chaotic arrangement about the matrix or can, alternatively, have a regular arrangement. Likewise, in highly preferred embodiments, the stabilizing chemical moiety is prepared from the reaction of the matrix with an ion which can include but is not limited to those ions listed above. Such a moiety is disposed on the matrix surface, in particular and advantageously on the surface of the mesoporous walls.

In part, the present invention is a sulfated zirconium dioxide catalyst which has (1) pores dimensioned about 2.5 nm to about 4.7 nm in diameter, (2) tetragonal crystalline pore walls at calcination temperatures between 600° C. and about 750° C., and (3) a BET specific surface area of about 50 m$^2$/g to about 150 m$^2$/g. This catalyst is obtainable by a process including (1) providing a mixture of a $C_8$–$C_{18}$ alkylamine and water—the mixture treated with acid and heat sufficient to homogenize the mixture, (2) combining the mixture with an anhydrous ethanolic solution of a zirconium alkoxide and acetylacetone, (3) washing the precipitate formed from this combination with ethanol to provide a solid, (4) treating the solid with dilute sulfuric acid, and (5) calcining the solid at a temperature between about 600° C. and about 750° C. for about 2 hours—with such a temperature reached at a rate of increase of about 0.5° C./min., then decreased to room temperature at a rate of about 1° C./min.

In part, the present invention is a method of preparing a mesoporous zirconium dioxide with a tetragonal crystalline pore wall structure from an organic precursor. The method includes (1) providing a alkanolic solution of a zirconium alkoxide. (2) combining the alkoxide solution with a mesopore template to form an insoluble solid. (3) treating the solid with a mesopore stabilizing agent including but not limited to a sulfur oxide, a transition metal oxide and a combination thereof, and (4) calcining the solid. In preferred embodiments, the mesopore template is a $C_8$–$C_{18}$ alkylamine in water at a pH sufficient to disperse the alkylamine homogeneously in the water. Where such a template is employed, the molecular dimension of the alkyl substituent determines, in part, the size and/or volume of the mesopores.

Likewise, in preferred embodiments, the alkoxide provided is an anhydrous ethanolic solution of zirconium propoxide. Whether or not such an ethanolic solution is utilized, preferred embodiments of the inventive method can include beneficial use of acetylacetone in the alkanolic solution. Where an ethanolic solution is utilized, the method can further include ethanolic extraction of the insoluble solid before treatment with a stabilizing agent, such as sulfuric acid or, alternatively and without limitation reagents to provide as stabilizing agents tungsten oxide, molybdenum oxide and yttrium oxide, or a combination thereof, for use with or without a sulfur oxide stabilizing agent.

Figure 2:
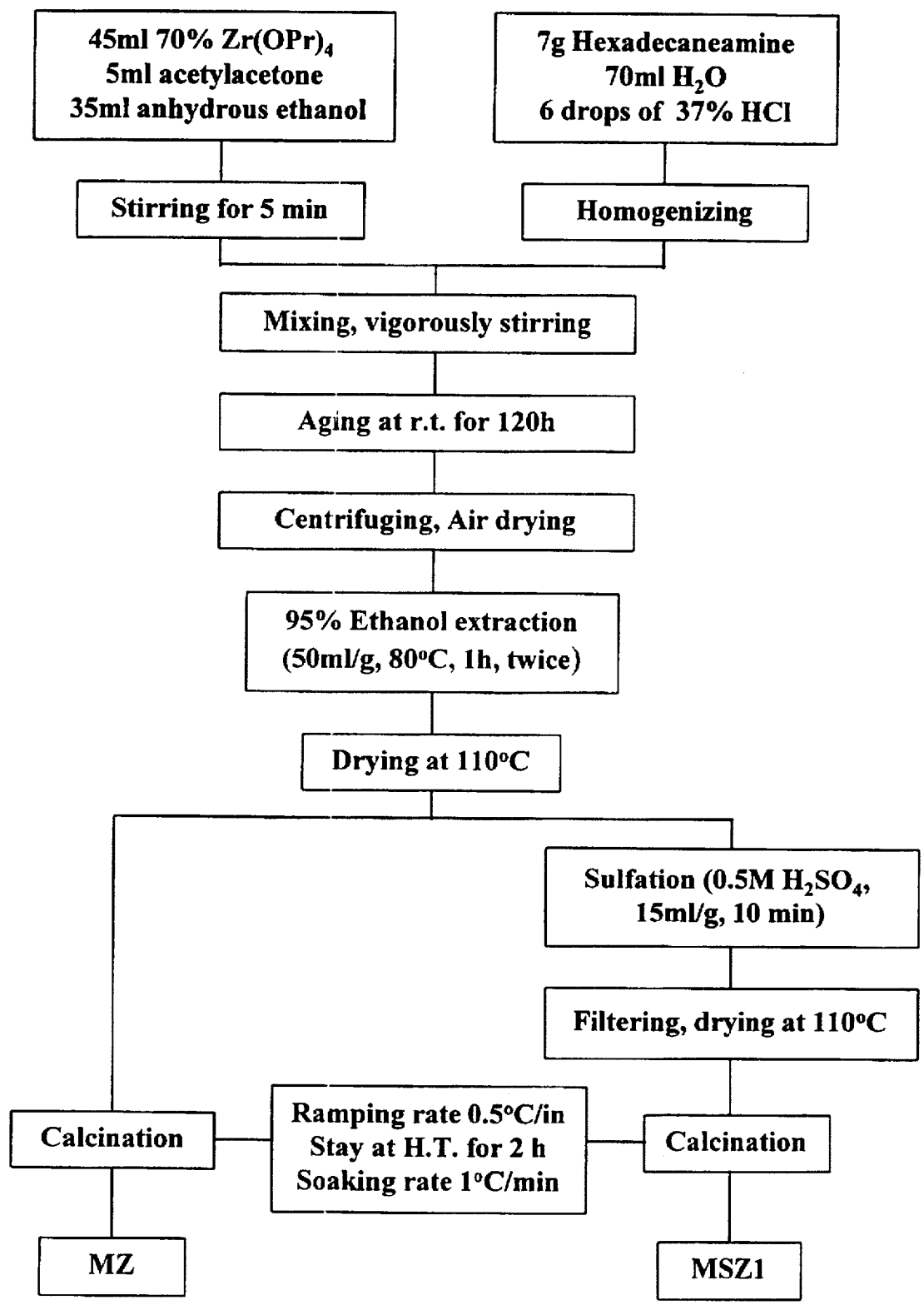
FIGS. 2 and 3 are flow charts showing, in a schematic fashion, preferred embodiments of the methods of this invention for the preparation of mesoporous zirconia, MZ, mesoporous sulfated zirconia, MSZ1, from an organic precursor and mesoporous sulfated zirconia, MSZ2, from an inorganic precursor, respectively.

Calcination of the solid is accomplished at a temperature which is known and which will provide the zirconium dioxide material with a specific surface area and an average pore volume. A zirconium dioxide having a mesoporous morphology and tetragonal crystalline pore wall structure can preferentially be obtained with calcination at a temperature reached at a rate of increase of about 0.5° C./min. See FIG. 2.

Figure 3:
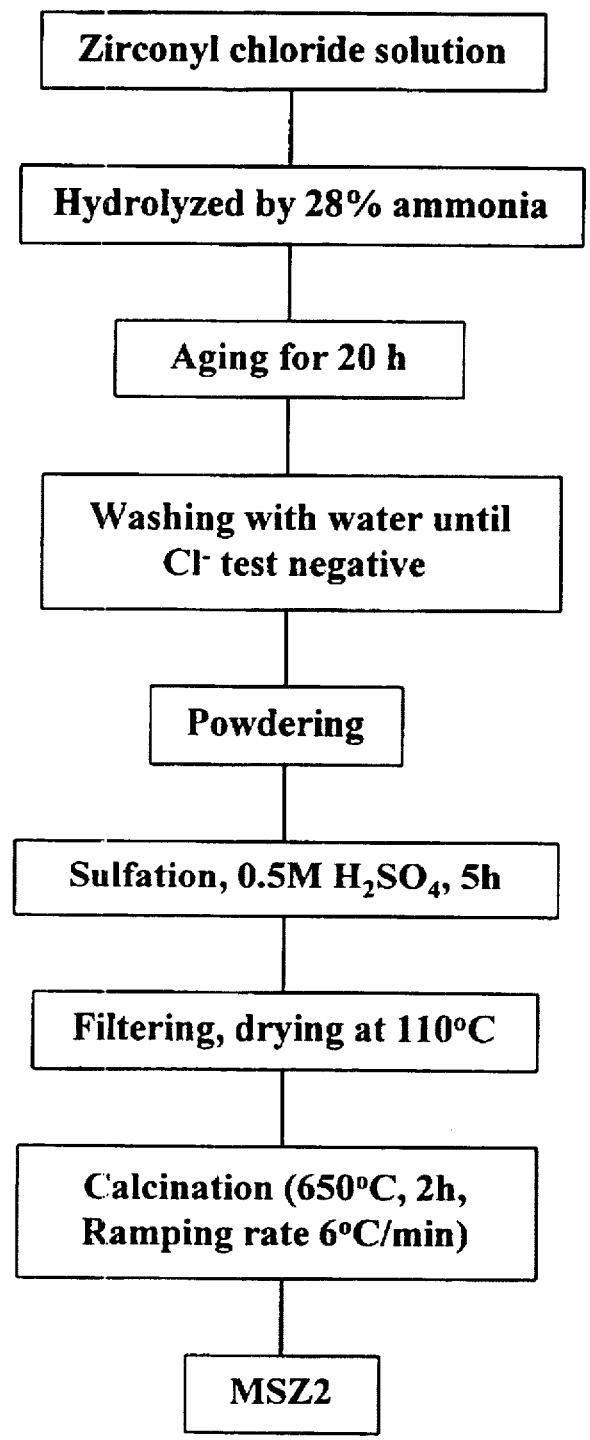
Figure 4:
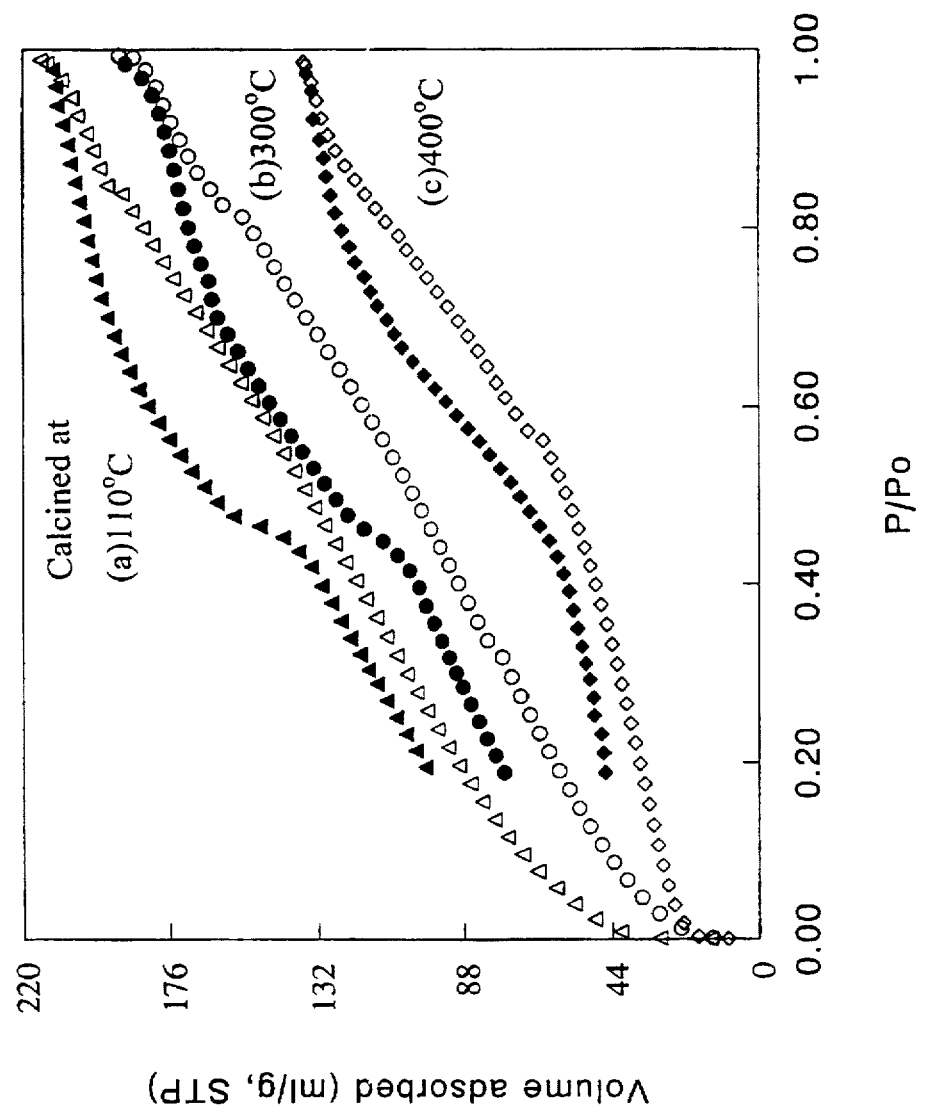
FIG. 4 shows nitrogen adsorption-desorption isotherms (at 77.35 K) of MZ calcined at the temperature shown (open symbol: adsorption; solid symbol: desorption)

In part, this invention is also a method of preparing a mesoporous zirconium dioxide with a tetragonal crystalline pore wall structure from an inorganic precursor. The method includes: (1) hydrolyzing an aqueous zirconyl chloride solution with aqueous ammonia, (2) treating the hydrolysis product with a mesopore stabilizing agent, which can be but is not limited to sulfur oxide, a transition metal oxide, or a combination thereof, and (3) calcining the stabilized product. In preferred embodiments, the stabilizing agent is sulfuric acid, and the stabilized product is calcined at a temperature reached at a rate of increase of about 6° C./min. By way of comparison, microporous zirconia of the prior art is prepared by calcining sulfated zirconia hydroxide (MEI) at 650° C. for 1 hour at a high ramping rate of about 10° C./min. See, FIGS. 1 and 3.

Whether prepared from organic or inorganic starting materials, the pore arrangement of the present zirconia is irregular and distinguishable from that of the prior art silica-alumina sieves, which have a hexagonal array of pores with a radius around 20 Å and a pore volume 0.79 ml/g. The tubular pores of such prior art sieves can be observed directly by TEM. By tilting a sample of such a sieve, a lamellar image in the direction perpendicular to the hexagonal arrays is observed. See, A. Chenite, Y. Le Page and A. Sayari, *Mater. Chem.*, 7, 1015 (1995). In contrast, when the zirconia samples of the present invention were tilted and observed by TEM, the same irregular pore image is observed for all tilting angles, showing the existence of a chaotic pore structure.

Unlike the prior art sieves which have good small angle X-ray diffraction patterns permitting index of structure symmetry, the present material has only one broad small angle X-ray diffraction band which can not be used to index the structural symmetry. A broad small XRD signal indicates, however, some order of the pore long range structure. It is difficult to determine precise peak position because of the experimental inaccuracy. A peak position at d=41 Å is estimated.

Figure 5:
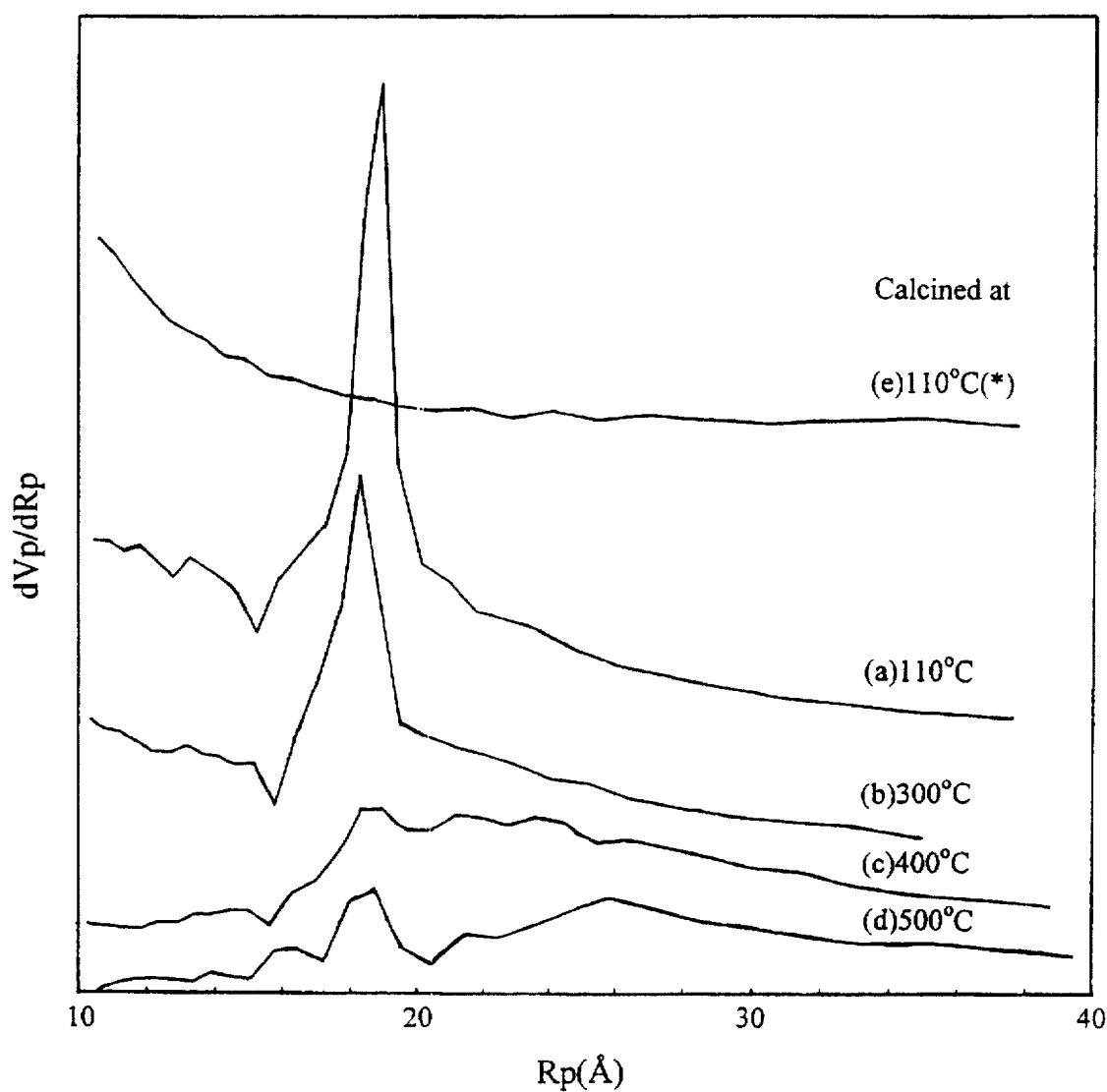
FIG. 5 shows pore size distribution profiles of MZ calcined at the temperature shown; *denotes zirconia obtained from uncontrolled hydrolysis, for the purpose of comparison.
Figure 6:
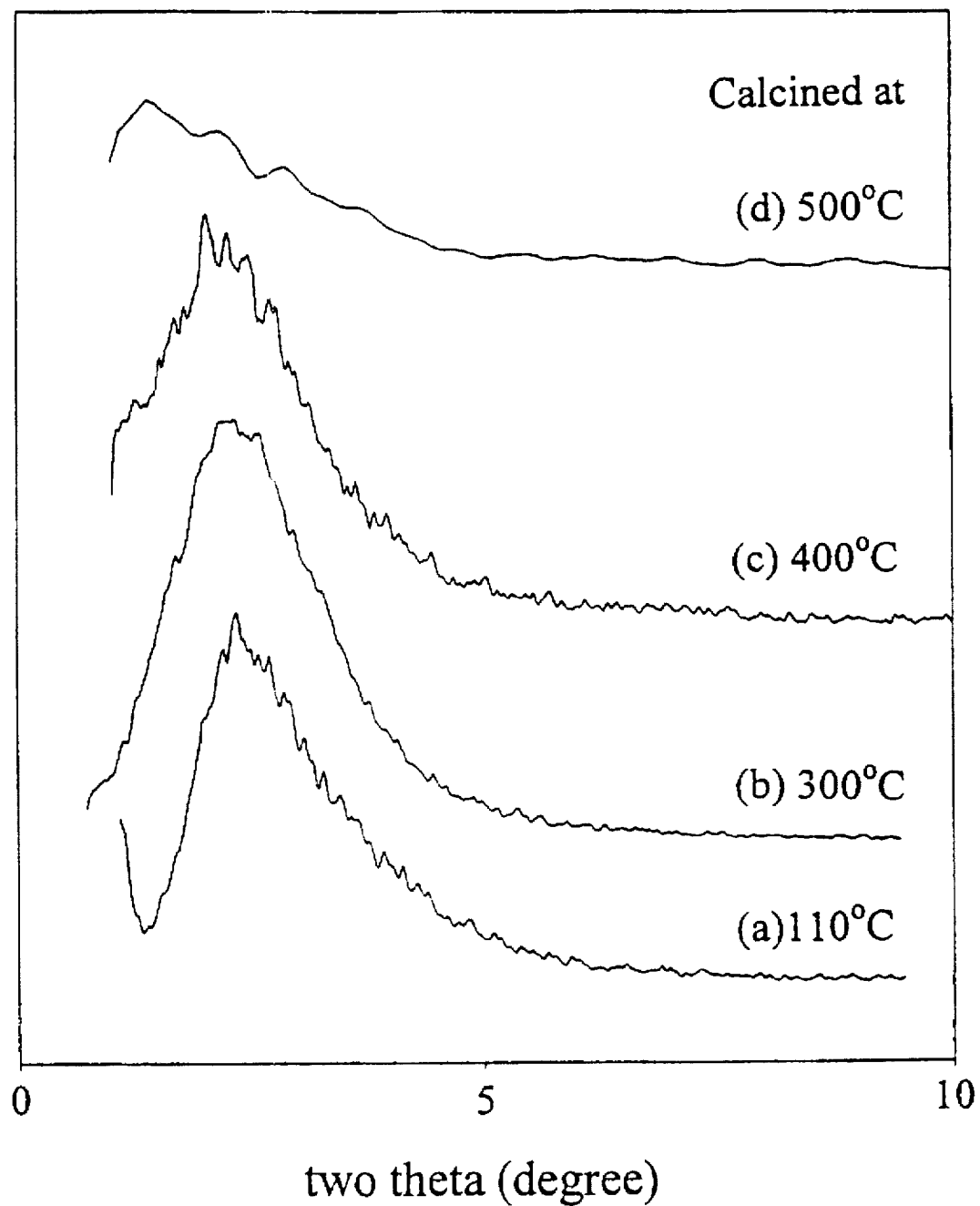
FIG. 6 shows small angle XRD profiles of MZ calcined at the temperature shown.
Figure 7:
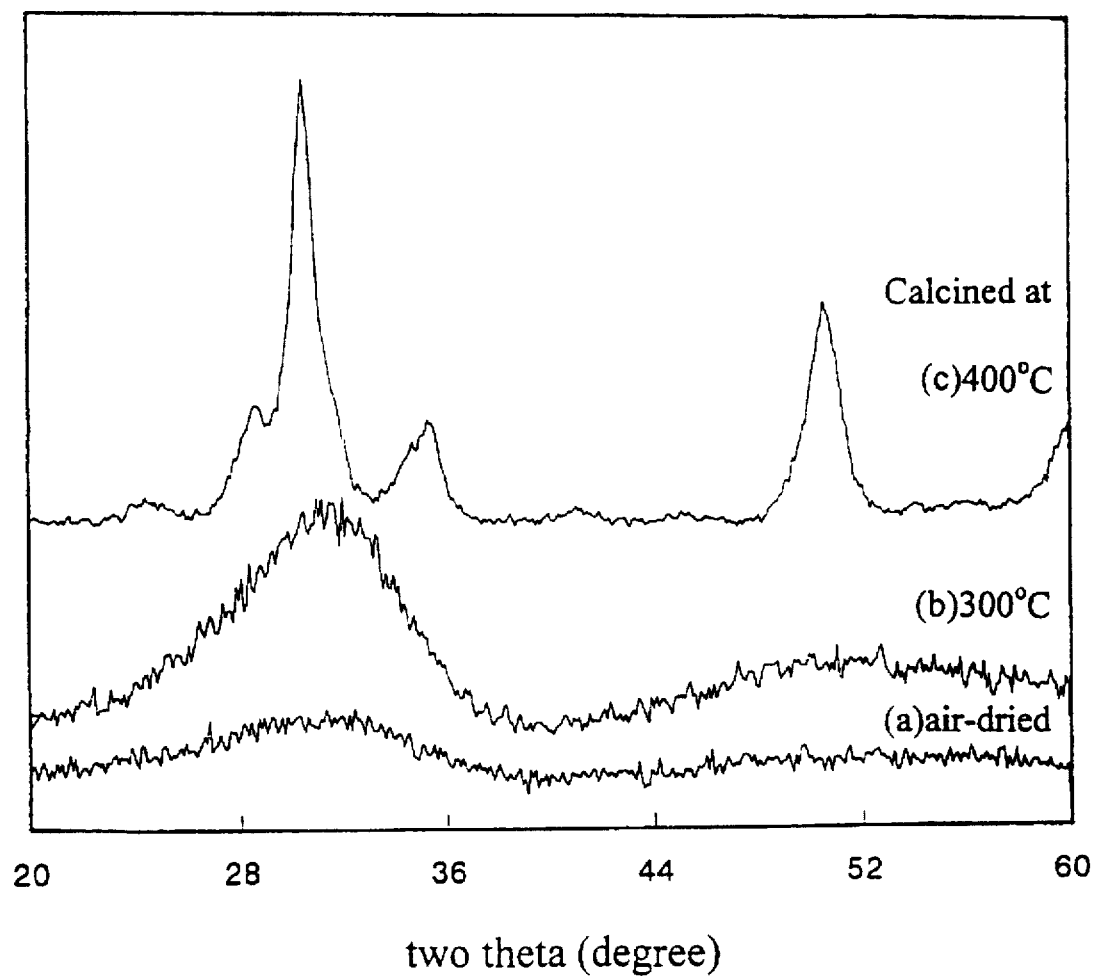
FIG. 7 shows large angle XRD profiles of MZ calcined at the temperature shown, but for (a) which was air-dried.
Figure 8:
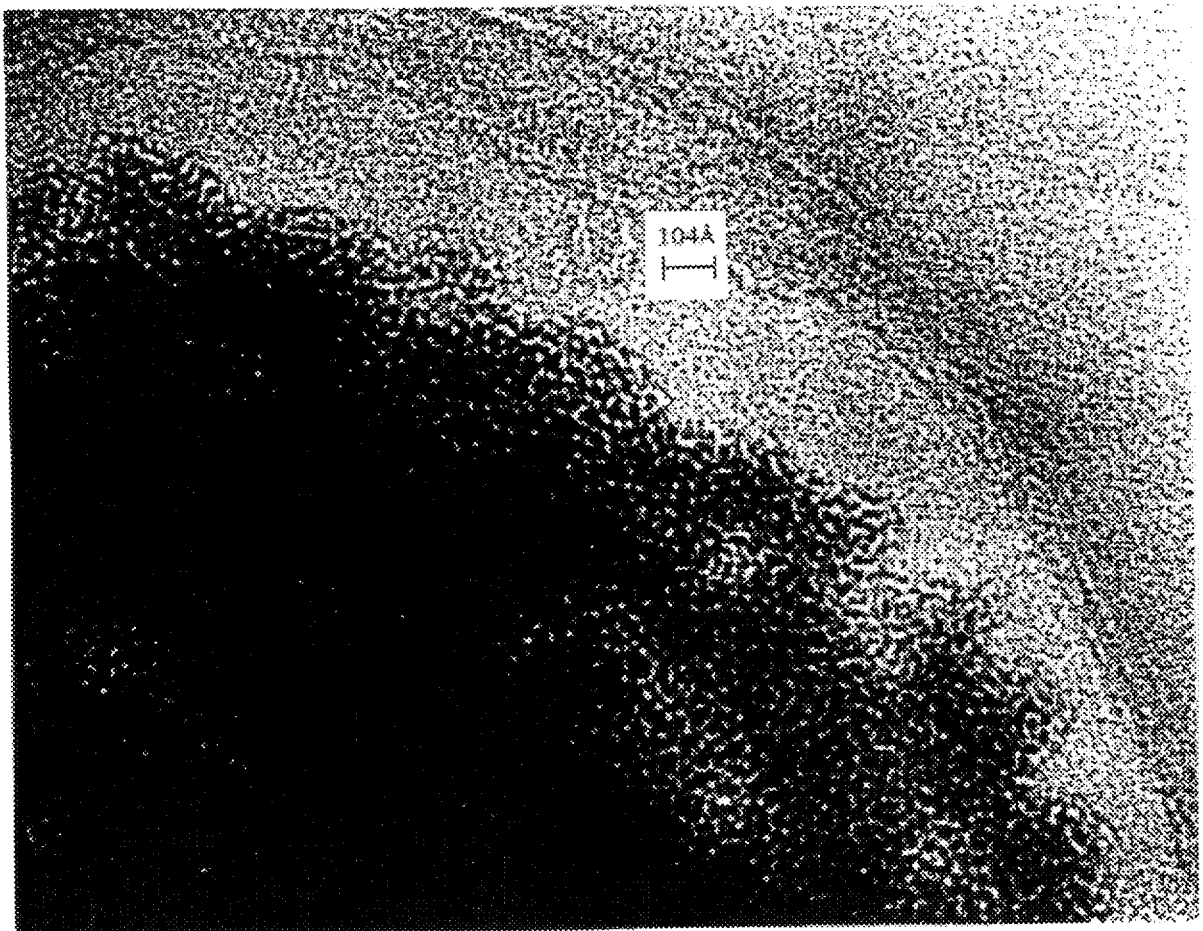
FIG. 8 is a TEM image of MZ calcined at 300° C.

After ethanol extraction and/or drying at 110° C., the mesoporous zirconia prepared as described above, has a large surface area. See, Examples 1 and 5, below. Calcination at various temperatures for 2 hours can be followed with the results characterized by $N_2$ adsorption-desorption and X-ray diffraction. See, also FIGS. 4–7 and Example 5, below. The nitrogen adsorption-desorption isotherms of the calcined samples are of type IV. Remarkably, the narrow distribution of pores with radius of 18.5 Å is maintained up to 300° C. calcination. Calcination at higher temperature results in the loss of such a feature. See, FIG. 5.

In conventional zirconia, the micropores will collapse with increasing calcination temperature and wider pores will form with broader pore size distribution. See, P. D. L. Mercera, J. G. Van Ommen, E. B. M. Doesburg, A. J. Burggraaf and J. R. H. Ross, *Appl. Catal.* 57, 127 (1990). The results of FIGS. 4–7 and Example 5 demonstrate a different behavior of present amorphous-walled precursor for mesoporous zirconia: its structure can be maintained up to 300° C., before crystallization becomes detectable. The TEM image of a 300° C. calcined sample clearly shows the irregular pore structure.

Remarkably and contrary to the prior art, crystallization of the pore walls does not appear to be accompanied by collapse of the pore structure. There is still a broad small angle XRD signal for the sample after 400° C. calcination. This behavior is unique to the present invention and both unexpected and surprising, given that all other mesoporous materials previously described display extensive pore collapse at temperatures where crystallization of pore walls is detectable.

It is known that in the context of microporous zirconia, the addition of a second compound such as sulfuric acid to zirconia hydroxide will delay its crystallization and restrain the transformation of tetragonal zirconia into the monoclinic modification. See, B. Y. Zhao, X. P. Xu, H. R. Ma, J. M. Gao, D. H. Sun, R. Q. Wang and Y. Q. Tang, Acta Phys. Chimo Sinica, 9, 8 (1993). In a departure from the prior art, the mesoporous zirconia precursors of this invention were treated with diluted sulfuric acid and calcinated at high temperature. Sulfation effected stabilization. As shown in FIGS. 9–12 the large angle XRD, adsorption-desorption isotherm, pore size distribution and small angle XRD profiles are shown for sulfated mesoporous zirconia. These results are also summarized in Example 7, below.

Figure 9:
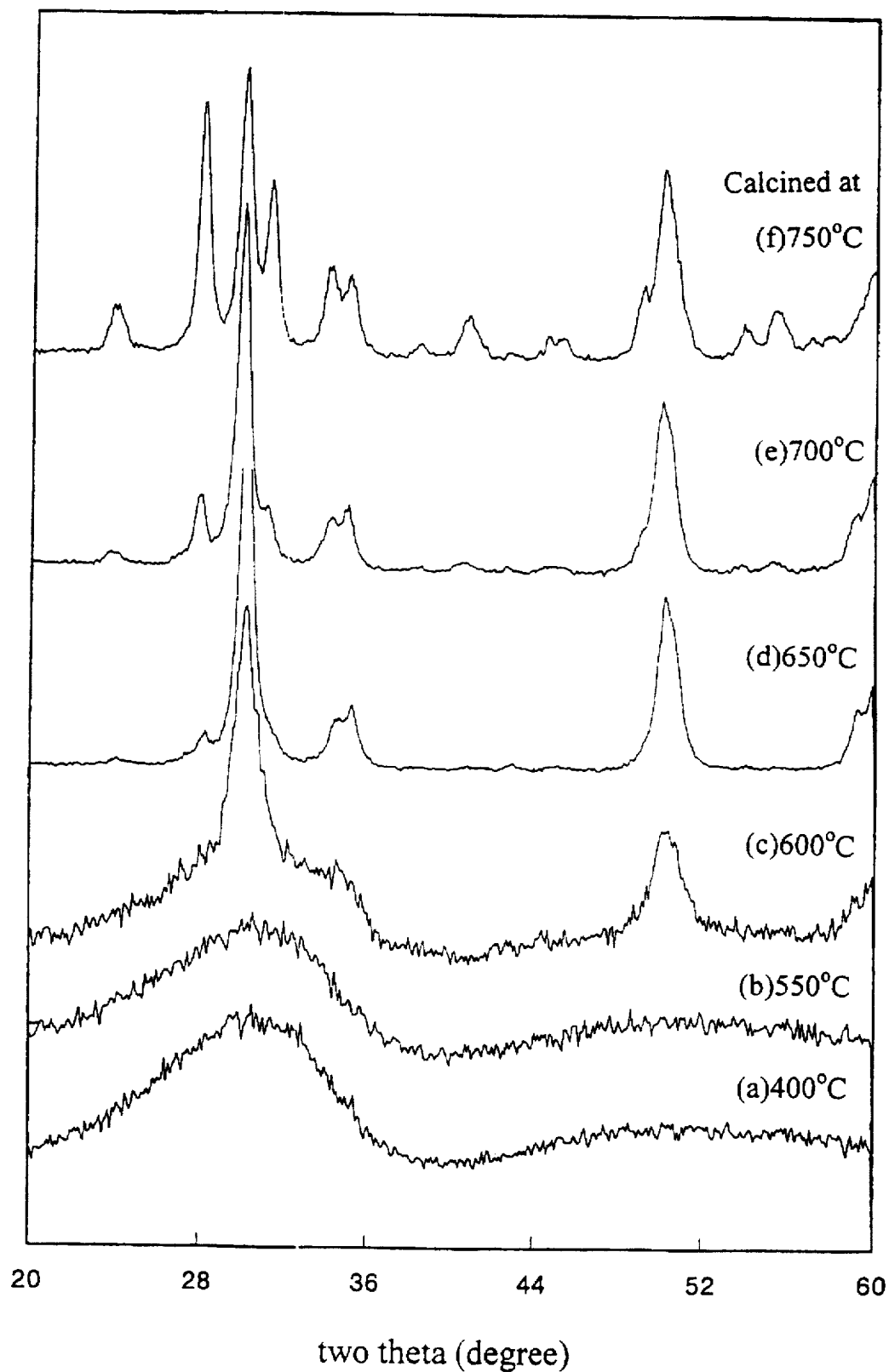
FIG. 9 shows large angle XRD profiles of MSZ1 calcined at the temperature shown.

Large angle XRD analysis. FIG. 9, shows that sulfation delays the crystallization of zirconia hydroxide and the transformation of the tetragonal into the monoclinic modification. Accordingly, sulfated mesoporous zirconia, unlike non-sulfated zirconia, is still amorphous after calcination at 550° C. Formation of the tetragonal modification starts at 600° C. and is complete at 650° C. The sample calcined at 700° C. still contains majority of tetragonal phase. At 750° C. calcination, the majority of the material finally transforms into monoclinic modification.

Figure 10:
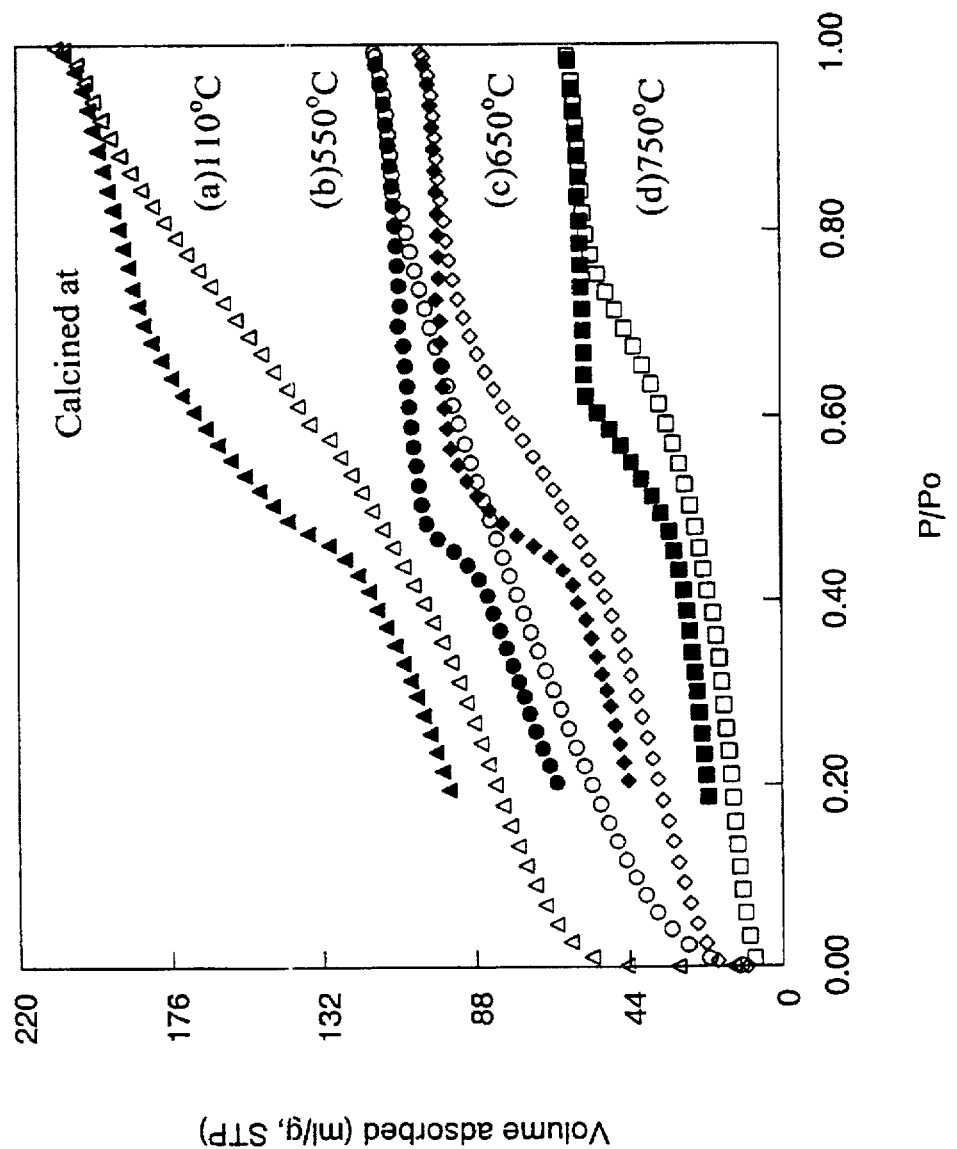
FIG. 10 shows nitrogen adsorption-desorption isotherms (at 77.35 K) of MSZ1 calcined at the temperature shown (open symbol: adsorption; solid symbol: desorption)
Figure 11:
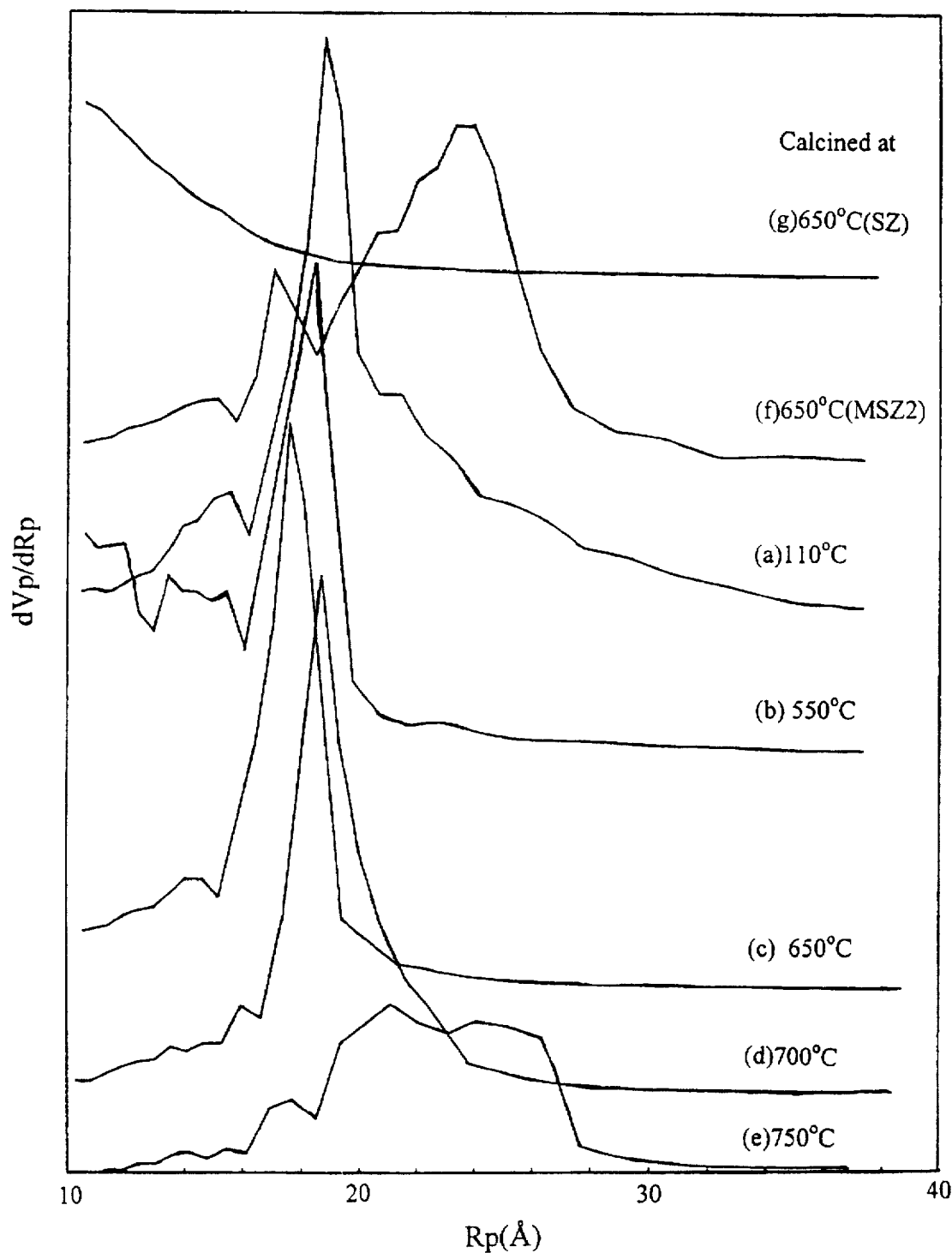
FIG. 11 shows pore size distribution profiles of SZ, MSZ1 and MSZ2, calcined at the temperature shown (the profiles are for MSZ1 unless otherwise indicated)
Figure 12:
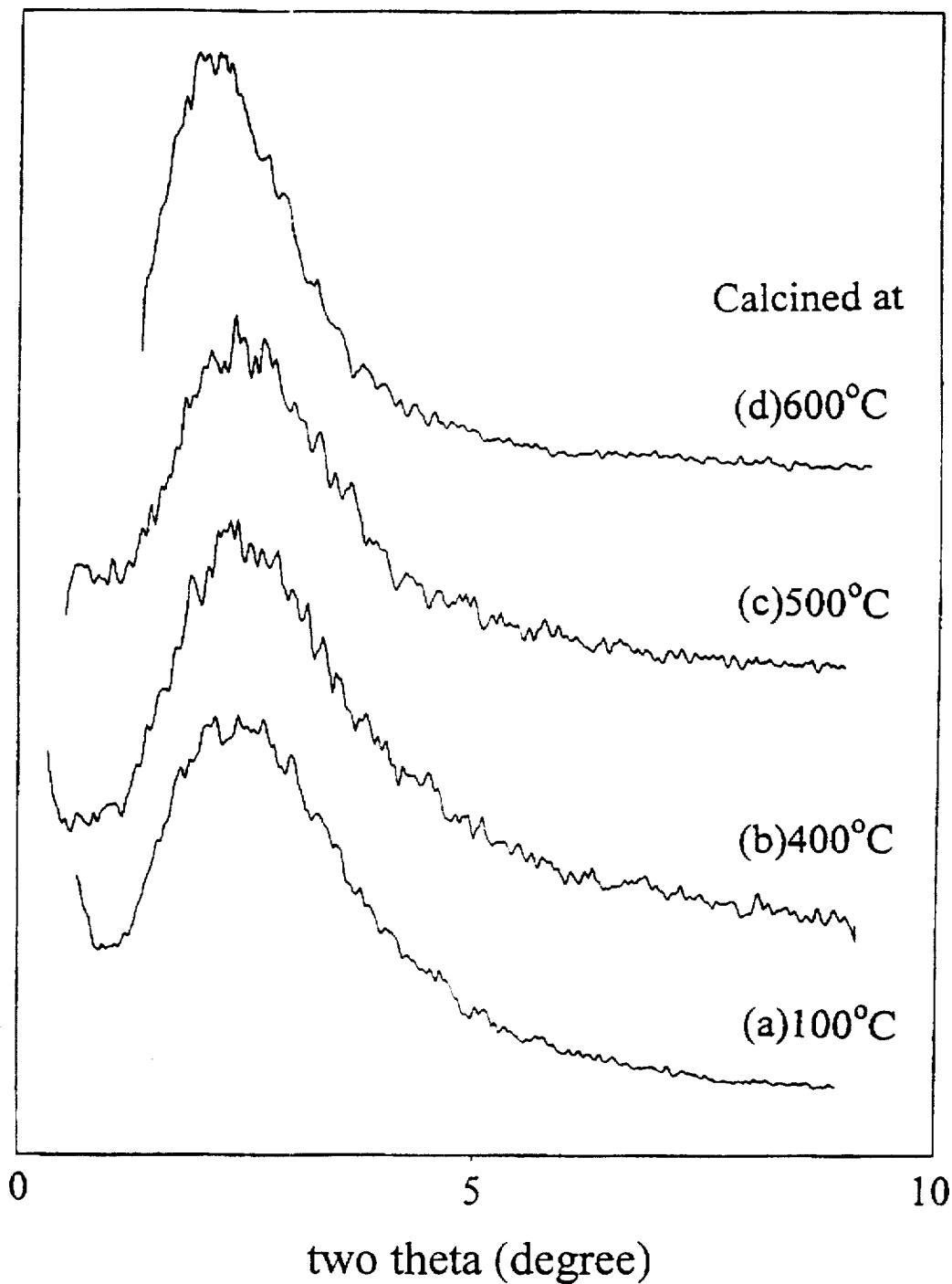
FIG. 12 shows small angle XRD profiles of MSZ1 calcined at the temperature shown.

Sulfation also helps to maintain the mesoporous structure of zirconia through high temperature calcination. All the nitrogen adsorption-desorption isotherms of sulfated mesoporous zirconia calcined at different temperatures are of type IV. FIG. 10, and the pore size distribution based on desorption branch indicate the narrow distribution feature around 18.7 Å (WHH=2.1 Å) is maintained up to 700° C. calcination, FIG. 11. However, the broad peak of small angle XRD is obtained only 600° C. calcined sample, FIG. 12.

Figure 13A:
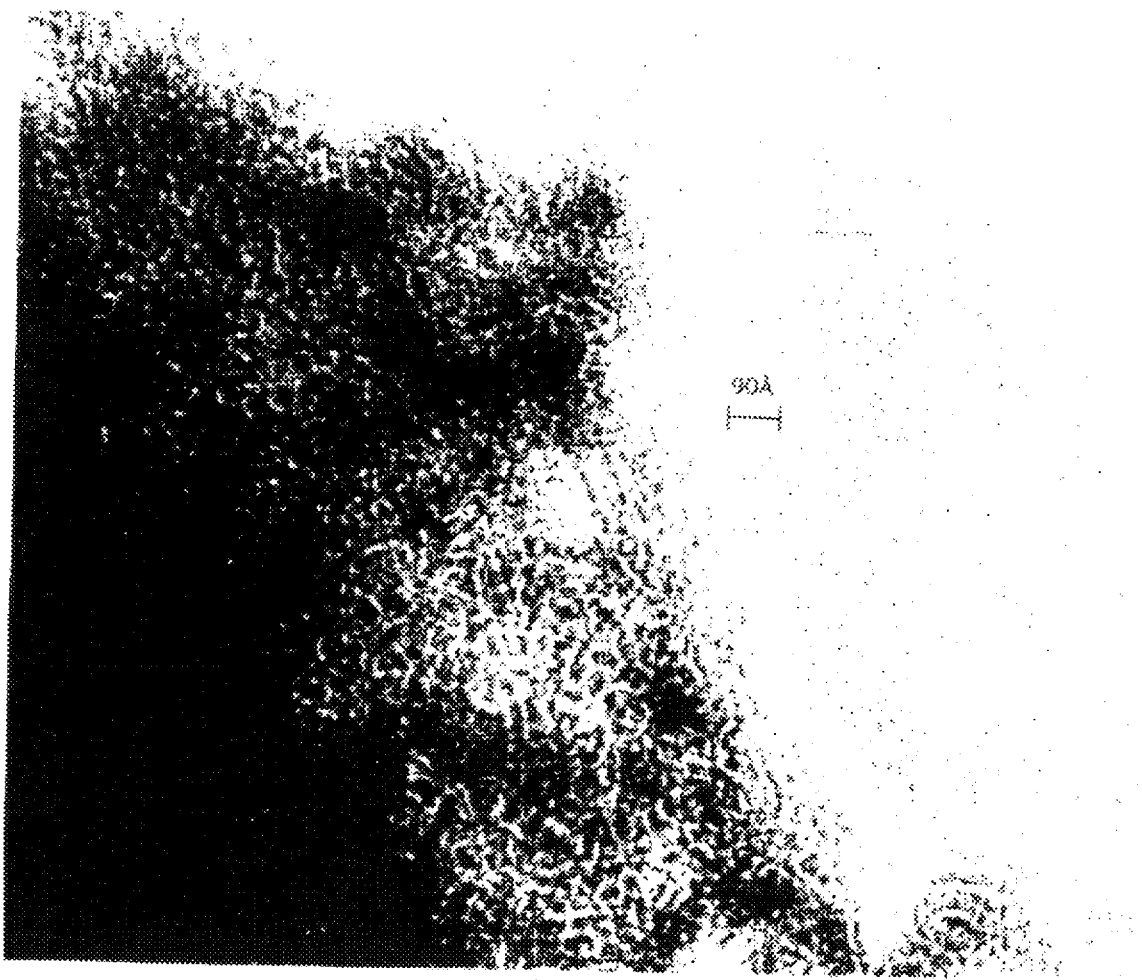
FIGS. 13A–C provide TEM images of MSZ1 calcined at 650° C. and show the porous part, compact crystalline phase and porous part with high magnification, respectively.
Figure 13B:
Figure 13C:

TEM can be employed to check the wall structure of this material after high temperature calcination. TEM image of sulfated mesoporous zirconia calcined at 550° C. calcination shows the same pore forms as that of 300° C. calcinated sample without sulfation. However, TEM images of mesoporous sulfated zirconia calcined at 650° C. indicate that there are two types of particles in this material: porous particles, FIG. 13A, and compact crystalline particles, FIG. 13B. The same situation holds after calcination at 700° C. As the magnification of the TEM image of the porous particles in FIG. 13A is increased, the tetragonal crystallinity feature of the fine particle is again evidenced, FIG. 13C, showing that the pore walls are actually composed of fine tetragonal particles.

Figure 14:
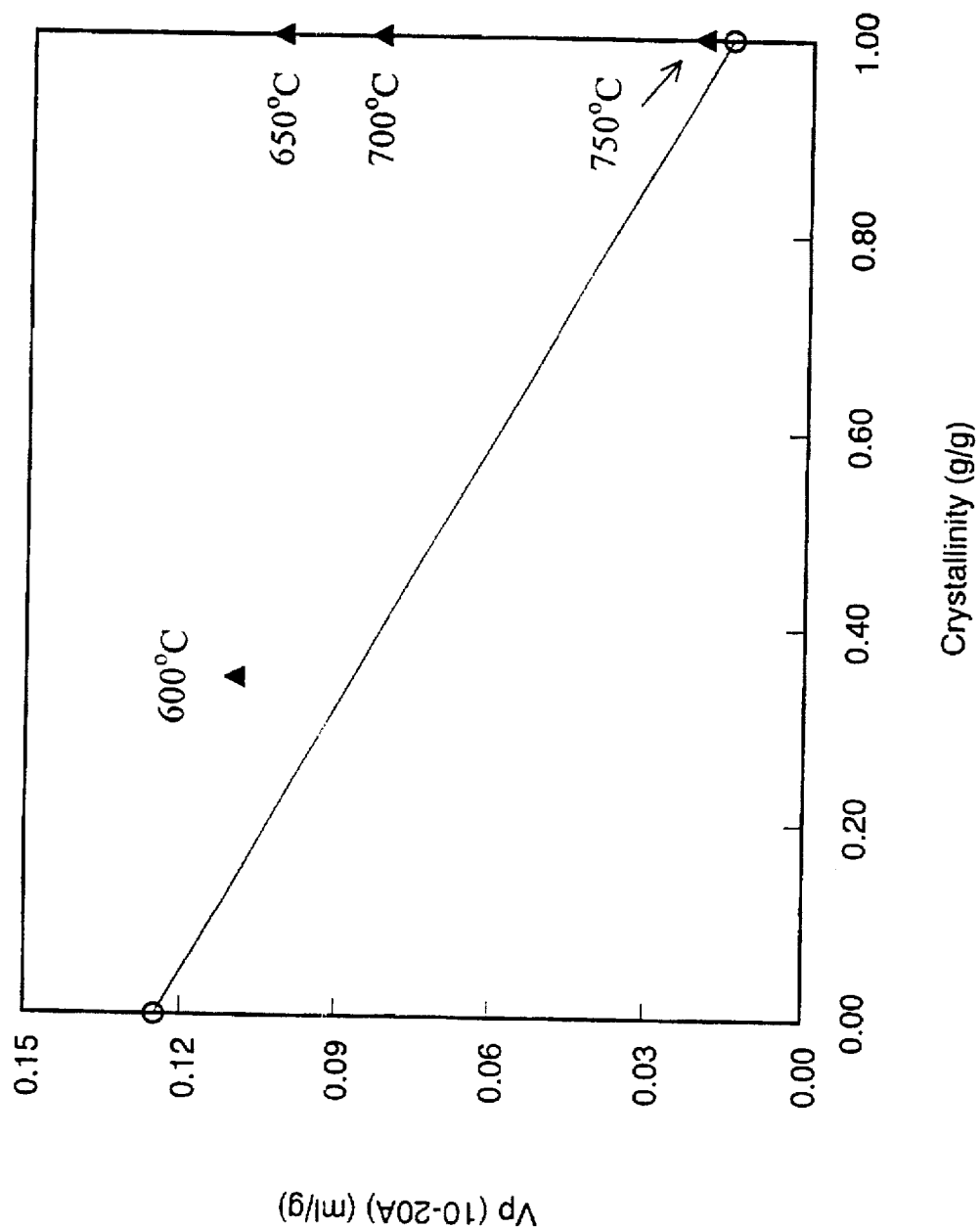
FIG. 14 plots volume of pore with radii in the range of 10–20 Å vs. total crystallinity for MSZ1[$ZrO_2(t)+ZrO_2(m)$] calcined at the temperature shown (open circle: points defining physical mixture; closed triangle: data points for calcined mesoporous material) and FIG. 15 plots activity (% conversion vs. time) per 0.4 gram of SZ and MSZ1, calcined at the designated temperature, for n-butane isomerization (200° C., 1% n-$C_4$/He, 70 ml/min; and the plots are for MSZ1 unless otherwise indicated).

Further evidence to support the present tetragonal pore wall structure is obtained from the pore volume data. When conventional sulfated zirconia crystallizes to form the tetragonal modification, the microporosity is lost and larger pores are formed. For purposes of comparison, one conventional sulfated zirconia was calcinated at 650° C. was found to be tetragonal with pores having a radius of about 23.7 Å. The volume of such pores with radii in the range of 10–20 Å is very small, only 0.015 ml/g. This volume is more than one order lower than the pore volume of the present mesoporous sulfated zirconia, which after calcination at 550° C. has a pore volume of 0.125 ml/g with radii in the range of 10–20 Å and amorphous pore walls. These two points define a straight line in the plot of the pore volume against the total crystalline phase content, as indicated in FIG. 14. If the material obtained by partial crystallization is a simple mixture of compact crystalline zirconia and amorphous mesoporous zirconia, the volume of pores with radii in the range of 10–20 Å would decrease linearly with increasing crystallinity. This relationship can be used as an experimental criterion to distinguish between such a physical mixture and a material which has crystallinity in the mesoporous topology, i.e. crystalline pore walls. The experimental data in FIG. 14 clearly show a very significant deviation from linearity. Even for the sample calcined at 700° C. and displaying good crystallinity, the volume of pores with radii in the range of 10–20 Å is much higher than that of conventional sulfated zirconia calcined at 650° C.

Figure 15:
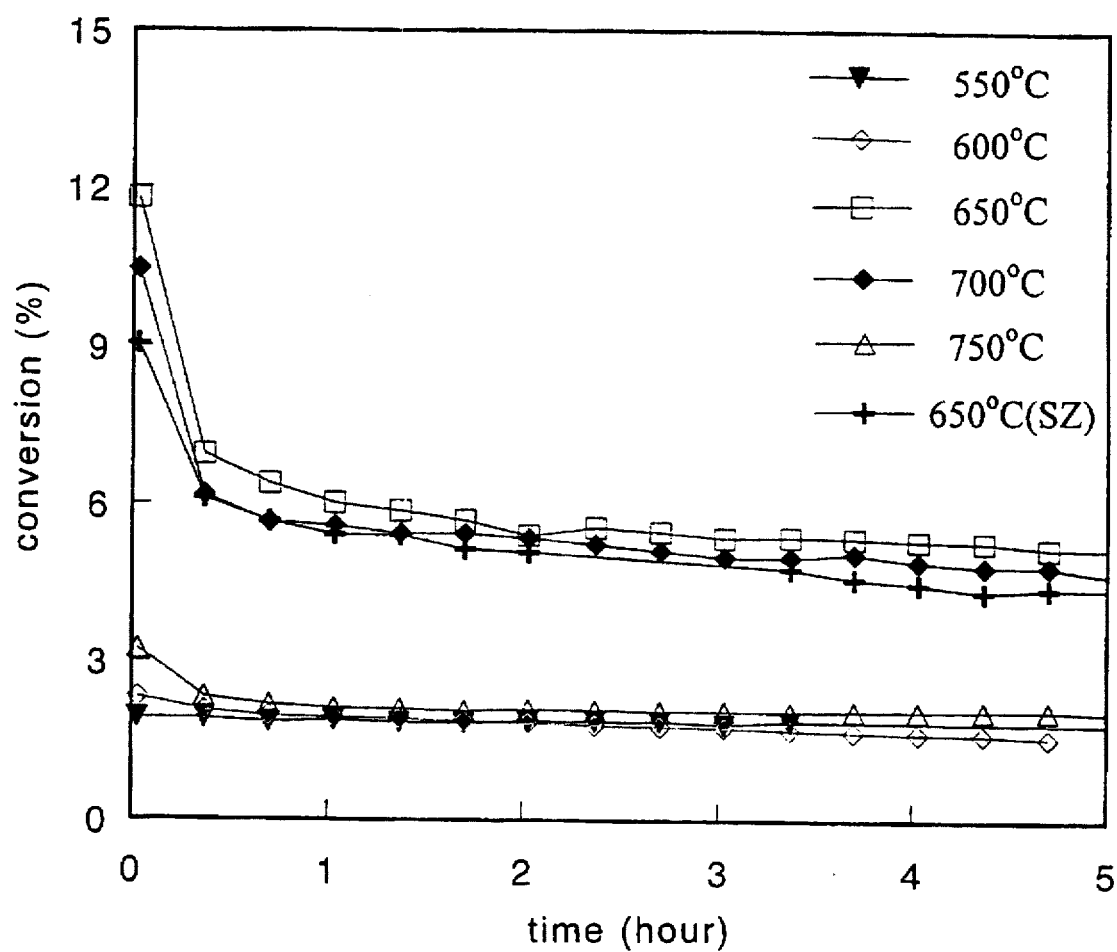

As mentioned above, sulfated zirconia of the prior art is highly active as acid catalyst for the isomerization of n-butane at low temperature. The mesoporous sulfated zirconia of the present invention was tested as catalyst for n-butane isomerization under the same reaction conditions. See, Example 3, below. The results are presented in FIG. 15. The inventive mesoporous sulfated zirconia calcinated at 650° C. has the highest activity for n-butane isomerization. All samples have a high initial activity for n-butane isomerization but deactivate rapidly. Besides iso-butane, minor amounts of pentane and propane are detected in the product.

With reference to Example 8, below, the reaction characteristics of sulfated mesoporous zirconia are virtually identical with those found for microporous sulfated zirconia. The conversion at 2 minutes TOS is listed as initial conversion. Besides this value, the sulfur content, content of tetragonal phase, and the surface sulfate ion surface density are given. The space time yield (STY) is defined for the purpose of this example as the volume (STP) of n-butane converted to iso-butane per unit of sulfur per unit of time and listed in the last column of the table of Example 8.

The results confirm that only samples with a substantial content of tetragonal zirconia have high activity after calcination at high temperature, in agreement with the well known fact that monoclinic zirconia is much less active. For mesoporous sulfated zirconia the surface area and the surface density of sulfur decrease but the content of the tetragonal phase varies with calcination temperature. The highest activity is attained by calcining at 650°–700° C., though the activity of the sample calcined at 650° C. is higher than that of the sample calcined at 700° C., the STY is higher for the latter sample. Without limitation or adopting any one mode or theory of operation, this could suggest that sites created by the interaction of sulfate ions with large tetragonal zirconia particles are more active than sites attached to small tetragonal zirconia particles. In comparison with prior art microporous sulfated zirconia calcined at 650° C., the mesoporous sulfated zirconia of this invention calcined at 650° C. has a similar content of the tetragonal modification, surface density of sulfate ions and space time yield.

Nitrogen physisorption measurements show that the prior art sulfated zirconia prepared by 650° C. calcination of sulfated zirconia hydroxide (from MEI) is microporous, FIG. 11(f), but that a sulfated zirconia of this invention, as prepared herein by using zirconyl chloride and 650° C. calcination, is mesoporous with pore radii of 23.7 Å, FIG. 11(g). Both the prior art and inventive zirconias are crystalline in the tetragonal modification, as indicated by large angle XRD. In order to demonstrate an advantage of the mesoporosity of the inventive catalyst, the alkylation of a relatively large molecule was chosen as a probe, and used with sulfated zirconia catalyst samples having different pore size distribution characteristics. See Example 4, below. Mesoporous sulfated zirconia, calcined at 650° C., referred to as MSZ1 and MSZ2, and a prior art zirconia were tested. As shown above, these three samples have similar surface area, similar tetragonal phase content and sulfur content.

The alkylation of 1-naphthol with 4-tert-butylstyrene can be expressed by the following equation:

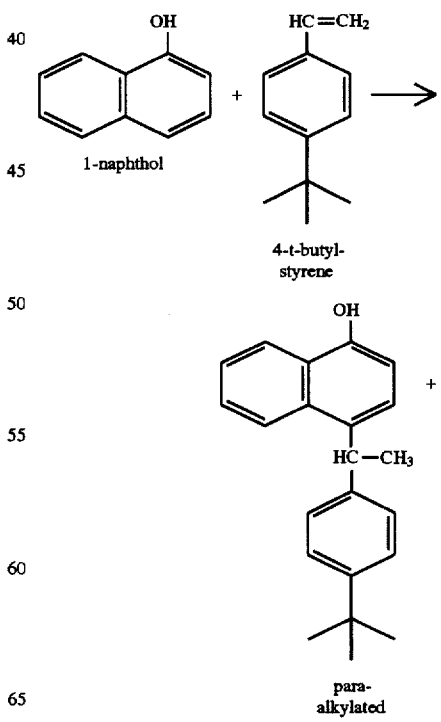

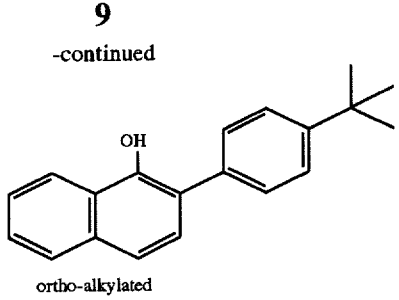

ortho-alkylated

Usually, the content of para-alkylation product is higher than that of orthoalkylation product. Other side reactions, such as dimerization of 4-tert-butylstyrene and multi-alkylation of 1-naphthol, will also take place over acidic catalyst. The following table shows the results of the catalytic tests. The composition after reaction is, for simplicity, given in terms of the GC peak areas.

Finally, the zirconium alkoxides hydrolize and condense extensively with increased time.

In contrast to silicon alkoxides, zirconium alkoxides exist in the form of a polymer in which the coordination number of zirconium reaches 6. The complexity of the polymer is 3.6 for $Zr(n-OPr)_4$ and 2 for $Zr(iso-OPr)_4$. See, D. C. Bradley and D. G. Carter, Can. J. Chem., 40, 15 (1962); D. C. Bradley, Coordin. Chem. Rev., 2, 299 (1967). Addition of acetylacetone increases the structural complication of zirconium alkoxides further. However, the addition of acac of 1:2 acac/Zr ratio is still unable to saturate the coordination number of zirconium atom. Therefore, more ethanol addition is needed. The interaction of acac with zirconium is stronger than that of propanol or ethanol. Ethanol and acac probably saturate the coordination of the zirconium atoms but water remains able to replace part of these ligand molecules. After addition of acac and ethanol the partially hydrolyzed zirconium alkoxides will interact with surfactant to form mesoporous structures. If the acac/Zr ratio is high,

| | | Composition of reaction mixture (%) | | | | | |
|---|---|---|---|---|---|---|---|
| catalyst | 1-naphthol | 4-t-butyl styrene | p-alkylated product | o-alkylated product | styrene dimer | heavier product | others |
| no reaction | 34.00 | 61.16 | 0 | 0 | 0 | 0 | 448 |
| SZ(650° C.) | 23.48 | 62.36 | 10.24 | 0 | 0 | 0 | 3.92 |
| MSZ1 (650° C.) | 21.18 | 46.88 | 14.02 | 8.89 | 0.72 | 4.74 | 3.57 |
| MSZ2 (650° C.) | 14.84 | 35.99 | 18.28 | 11.54 | 3.22 | 12.64 | 3.49 |

The above results show: (1) With the two mesoporous catalysts, MSZ1 (650° C.) and MSZ2 (650° C.), both ortho- and para-alkylated products are obtained. The concentration of para-alkylated product is higher than that of ortho-alkylated product. Besides there are heavier products formed. However, no significant difference is observed between MSZ1 (650° C.) and MSZ2 (650° C.). (2) With standard microporous sulfated zirconia SZ, only para-alkylated product is obtained. Also the concentration of para-alkylated product in the reaction mixture at the same time is lower than that of mesoporous sulfated zirconias. For n-butane isomerization, all these three catalysts have similar activities and selectivities, because both reactant and product molecules are much smaller than the pores. However, for larger molecular reaction, mesoporous sulfated zirconias show obvious advantage over microporous sulfated zirconia. Both, MSZ1 (650° C.) and MSZ2 (650° C.) have a relatively large pore size. As a result, both have similar activity and selectivity for this reaction and the same would be expected for other systems having similar steric requirements.

Again, without limitation to any one mode or theory, the chaotic property of mesoporosity of zirconia may be interpreted on the base of the structural and sol-gel characteristics of zirconium alkoxide. According to Stucky's generalized cooperative formation mechanism, the mesostructure is formed by a four-step process. As for the formation of the present mesoporous zirconia, the first step is interaction via hydrogen bonding of the surfactant molecule with a partially hydrolyzed zirconium alkoxide polymer. In this process micellae serve as a source for surfactant molecules, which rearrange according to the requirements of charge density and shape. Then the organized zirconium hydroxide surfactant aggregates nucleate and precipitate rapidly with configuration determined by the cooperative interaction of aggregate charges, geometries, and van der Waals forces.

hydrolysis of the zirconium complexes will be slow due to the strong interaction of acac with the zirconium atom. Only some gel is formed. Further extraction with 95% ethanol removes not only the surfactant but also increases further the hydrolysis of the zirconium complex. Then mesoporosity is accessible.

Without the addition of ethanol to the aqueous surfactant solution, water molecules or surfactant molecules probably will interact with zirconium precursor and form rapidly a stable complex. In this case, no rearrangement of the surfactant molecules can take place and no ordered micellae will be formed. The weak XRD signal of such complex is reminiscent of protein crystals.

Another sol-gel characteristic of zirconium alkoxide is that its condensation is an aggregation-condensation process, in contrast to the polymerization-condensation process of silicon alkoxide. Partially hydrolyzed zirconium alkoxide will aggregate rapidly before further hydrolysis and condensation. Due to the complexity of zirconium alkoxide precursor after acac addition and its sol-gel process, it is difficult to get the rearrangement of micelle in a well-defined geometry. The high coordination number of zirconium also make the formation geometry of zirconium surfactant interaction and zirconium hydroxide condensation complicated. Only some distorted micellae are formed.

While timely addition of sulfate ions is crucial for the preparation of mesoporous material with crystalline wall characteristics, the sulfate ion is not unique in this respect. Other transition metal oxides such as $WO_3$, $MoO_3$, $Y_2O_3$ are expected to have the same effect on the morphology of zirconia. Such additives will thus also lead to mesoporous zirconia and other new mesoporous catalysts.

Without limitation, the stability of the mesoporous structure can be explained by the observation that the interatomic Zr—Zr and Zr—O distances in amorphous zirconia gel are similar to the corresponding distances in the tetragonal structure. The metastability of tetragonal zirconia has been attributed to this structural similarity between the amorphous precursor and the tetragonal phase. See, R. Srinivasan, T. R. Watkins, C. R. Hubbard and B. H. Davis, *Chem. Mater.*, 7, 725 (1995). For mesoporous zirconia, the precursor pore walls are amorphous. The present results indicate that after sulfation and carefully controlled calcination, the long range order structure can be maintained. This is likely to be a consequence of the limited short range structure deformation during the crystallization process. In contrast, the transformation from the tetragonal to the monoclinic modification implies a much greater change in short range structure; this then results in the collapse of mesopores.

Prior art structures have been prepared by using biomineralization techniques, which involve the molecular construction of discrete self-assembled organic supermolecular systems that are used as preorganized environments for controlling the formation of finely directed inorganic materials. See. A. Monnier, F. Schüth, Q. Huo, D. Kumar, D. Margolese, R. S. Maxwell, G. D. Stucky, M. Krishnamuity, P. Petroff, A. Firouzi, M. Janicke, B. F. Chmelka, *Science*, 261, 1299 (1993); A. Firouzi, D. Kumar, L. M. Bull, T. Besier, P. Sieger, Q. Huo, S. A. Walker, J. A. Zasadzinski, C. Glinka, J. Nicol, D. Margolese, G. D. Stucky, B. F. Chmelka, *Science*, 267, 1138 (1995). Three constructional elements can be envisioned: (1) supermolecular preorganization, (2) interfacial molecular recognition (templating) and (3) cellular processing. For the synthesis of mesostructured materials, a three-dimensional periodic biphase can be produced by the organization of cationic, anionic or neutral organic and inorganic molecular species. The nucleation, growth and phase transitions of inorganic crystals may be directed by the charge density, coordination and steric requirements of the inorganic and organic species at the interfaces but not necessarily by a preformed structure. The approach uses cooperative nucleation of molecular inorganic solution species with surfactant molecules and their assembly at low temperature into a liquid-crystal-like array. As both the inorganic precursor, I, and the surfactant, S, can be present as positive or negative charged species, and as the combinations can be either direct or mediated by a cation $M^+$ or an anion $X^-$, four combinations are possible: $(S^+I^-)$, $(S^-I^+)$, $(S^+X^-I^+)$ and $(S^-M^+I^-)$. This scheme thus defines four ionic synthesis routes with direct and mediated combination of charged surfactant and soluble inorganic molecular species. Q. Huo, D. I. Margolese, U. Ciesla, P. Feng, T. E. Gier, P. Sieger, R. Leon, P. M. Petroff, F. Schüth and G. D. Stucky, *Nature*, 368, 317 (1994). A fifth route makes use of a neutral synthesis pathway $(S°I°)$ i.e. the combination of a neutral surfactant $(S°)$ and a neutral inorganic species $(I°)$. P. T. Taven and T. J. Pinnavaia. *Science*, 267, 865 (1995). The present invention can be understood through a conceptual variation of the neutral route $(S°I°)$ to prepare mesoporous zirconia, using zirconium propoxide as zirconium precursor and hexadecane amine as template.

Hydrolysis of metal alkoxides is more facile as compared to silicon alkoxides. A rough estimate of the partial charge distribution in metal alkoxides shows that the zirconium alkoxides and analagous transition metal alkoxides are susceptible to hydrolysis. See. J. Livage, M. Henry and C. Sanchez, *Prog. Solid St. Chem.*, 18, 259 (1988). However, the rate of hydrolysis can be controlled by adding a stabilizing agent such as acetylacetone (acac) J. C. Debsikdar, *J. Non-Crys. Solids*, 86, 231 (1986). Without limitation, it is believed that the addition of acac increases the coordination number of zirconium and stabilizes the alkoxide against reaction with water. While hydrolytic reactivity is substantially retarded, presumably by steric effects, hydrolysis is eventually effected. Addition of acetylacetone appears to be preferred for the formation of mesoporous zirconia, but use of a high acac/Zr ratio results in the formation of a clear sol. In the latter case no precipitate is obtained.

Addition of ethanol is also preferred for mesopore formation. If no ethanol is added and the acac/Zr ratio is kept constant at 1:2, some large brown particles are formed shortly after mixing the two solutions. These brown particles sometimes grow to more than 2 mm. These large particles are well crystalline under an optical microscope but they give only amorphous larger angle XRD characteristics. These particles are also stable, even if the reaction mixture is aged at 130° C. High temperature aging does not change the crystalline morphology of these large particles but an organic phase formed separately after high temperature aging. After filtering, air-drying and ethanol extraction, however, all the obtained materials display only microporosity.

With respect to the method(s) of this invention, ethanol should be added to organic zirconium precursor before the latter is hydrolyzed. If ethanol is added to the aqueous surfactant solution first, the same large brown particles are obtained. No mesoporosity is obtained after further ethanol extraction. The amount of acid is also important for the formation of mesoporosity. If a large amount of acid is added to the mixture, it remains only transparent and no precipitate is obtained. Attempts to remove the template from zirconia by calcining 500° C. in air for 6 hours result in the collapse of the mesostructure and formation of bulky tetragonal zirconia.

EXAMPLES OF THE INVENTION

The following non-limiting examples and data illustrate various aspects and features relating to the zirconia catalysts/materials and/or methods of the present invention, including the reactivity and/or interactive utility of such catalysts/materials in conjunction with various chemical reactions. Given the prior art, the microporosity of conventional sulfated zirconias and the limitations on their utility, the results/data provided are surprising and unexpected. While several examples demonstrate zirconia materials stabilized using a sulfate moiety, the same materials can be otherwise stabilized in accordance with this invention through straight-forward application of synthetic procedures well-known to those skilled in the art. Likewise, such materials can be used to support a variety of metals introduced through various impregnation techniques, ion exchange techniques and the like.

Nitrogen adsorption-desorption measurements were made using an Omicron Omnisorp 360 automatic adsorption instrument. Pore size distribution can be measured by nitrogen desorption kinetics (BJH method); this method makes use of the fact that nitrogen condenses in narrow capillaries; its desorption is described by the Kelvin equation:

$$\ln(p/p_o) = -\frac{2\gamma V}{rRT}$$

Here $p_o$ is the saturation pressure, $\gamma$ the surface tension, V the molar volume of the liquid, r the Kelvin radius, R the gas constant, and T the temperature.

Commercial instruments such as the OMNISORP 360 instrument (Omicron Technology Corporation) can be used

13 to provide data for the pore size distribution based on the desorption branch of nitrogen adsorption-desorption isotherms at 77.35 K (−195.8° C.).

X-ray powder diffraction analysis is done on a Rikagu Dmaxa X-ray diffractometer using CuKα radiation. α-alumina is used as an internal standard for quantitative analysis.

TEM images are obtained on a Hitachi HF-2000 high resolution analytical electron microscope equipped with emission cathode operated at 200 kV in bright field mode. The ex situ treated samples were supported on holey carbon coated copper grids for the experiment. Tilting experiments were done on a Hitachi H-8100 high resolution electron transmission microscope.

Example 1

Using an organic precursor, the mesoporous zirconia of this invention can be prepared as follows:

(a) 7 g of hexadecane amine (0.029 mol) is dissolved in a mixture of 70 ml deionized water and six drops of 37% HCl under heating below 80° C. to make the mixture homogeneous.

(b) 45 ml 70 wt. % $Zr(OPr)_4$ solution (0.1 mol) in PrOH is mixed with 5 ml acetylacetone (0.05 mol) and 35 ml anhydrous ethanol. It is stirred for 5 minutes. A brown clear solution is obtained. It is added to the first hot solution under strong string. Heating is stopped to cool down the first solution before the two solutions are mixed. Immediately after the combination of these two solutions a large amount of precipitate is formed. Stirring is continued for another half hour. Then the mixture is aged for 120 hours at room temperature. The solid is separated by centrifuge and dried at room temperature.

(c) The separated solid is extracted twice with 95% ethanol (50 ml/g) at 80° C. with stirring, filtered and washed with hot ethanol, and dried at 110° C. in air. The material so obtained has a large surface area (347 m²/g) and a high pore volume (0.31 ml/g) as determined by $N_2$ adsorption-desorption measurement (see, Example 5). The nitrogen adsorption-desorption isotherm of the sample is of type IV (see, FIG. 4). There appears to be a hysteresis loop which indicates the presence of mesopores. The pore size distribution based on the desorption branch is very narrow with pore radii around 18.5 Å (width at half height WHH=1.3 Å). (See, FIG. 5.) The broad small XRD band (FIG. 6) indicates some long range order structure. It is also consistent with the TEM images showing "chaotic" pores. Large angle XRD analysis shows that it is amorphous. (See, FIG. 7).

(d) After ethanol extraction, the sample is soaked into 0.5M $H_2SO_4$ (15 ml/g) solution for 10 minutes and filtered. The solid is dried at 110° C. The ethanol extracted or sulfated samples are calcinated according to the same procedure in static air. The temperature is increased to the designated point at the rate of 0.5° C./min, kept at that point for 2 hours and then decreased to room temperature at the rate of 1° C./min.

Example 2

Using an inorganic precursor, the mesoporous zirconia of this invention can also be prepared as follows:

Zirconia hydroxide is obtained by hydrolyzing $ZrOCl_2$ solution with 28% ammonia, washing with water and drying at 110° C. for 24 hours. It is then powdered, soaked in 0.5M $H_2SO_4$ for 5 hours, filtered and subsequently calcined at 650° C. for 2 hours with a ramping rate of about 6° C./min.

14

Example 3

Sulfated zirconia can be tested for n-butane isomerization at 200° C. in a flow system. 0.4 g catalyst is pretreated at 450° C. for 2 hours in air and cooled down to 200° C. n-Butane (1% in He) flows through catalyst bed at the rate of 70 ml/min. The reaction mixture is analyzed by an on-line GC.

Example 4

Alkylation can be performed in a static system. 0.5 g catalyst is pretreated at 450° C. in static air for 1 hour. After cooling down to room temperature, the catalyst is rapidly transferred into a flask and mixed with 0.15 mol (21.5 g) 1-naphthol and 0.3 mol (55 ml) 4-tert-butylstyrene. The mixture is refluxed at 120°–130° C. for six hours under stirring. Then the reaction mixture is cooled down to room temperature and analyzed by GC-MS to determine its composition.

Example 5

Properties of mesoporous zirconia (MZ unless otherwise indicated)*

| Cal. T (°C.) | Small angle XRD | Large angle XRD | $S_{BET}$ (m²/g) | $V_p(>10Å)$ (ml/g) | $R_p$ (Å) |
|---|---|---|---|---|---|
| 110 | b.b | am | 347 | 0.31 | 18.9 |
| 300 | b.b | am | 252 | 0.29 | 18.3 |
| 400 | b.b | am + t + m(w) | 133 | 0.22 | >20 |
| 500 | / | t + m | 95 | 0.16 | >20 |
| 110** | / | am | 290 | 0.3 | <15 |
| 110*** | / | am | 289 | 0.195 | <15 |
| SCE | / | am | 300 | 0.9 | 100 |
| MCM-41 | hexagonal | am | 1000 | 0.79 | 20 |

*b.b. = broad band;
t = tetragonal; m = monoclinic; am = amorphous; w = weak
**zirconia obtained from uncontrolled hydrolysis; ir: irregular pores
***zirconia from hydrolysis of $ZrOCl_2$ with ammonia;
SCE: zirconia aerogel after extraction with liquid $CO_2$
MCM-41: for comparison, a silica-alumina sieve material of the prior art, prepared according to Kresge et al., Nature, 359, 710 (1992).

The specific surface and pore volume of the mesoporous zirconia (MZ) decrease with increasing calcination temperature. Large angle XRD shows that material calcined below 300° C. is amorphous. At 400° C. calcination, zirconia starts to crystallize in the tetragonal modification. At 500° C. calcination, tetragonal zirconia starts to transform into the monoclinic modification, as is observed with prior art zirconia prepared by hydrolysis of zirconyl chloride with ammonia. Small angle XRD profiles show that there is a broad band for samples calcined below 400° C. After calcination at 500° C. no such signal is observed. Similar to the situation after drying at 110° C., the peak position is estimated at d=41 Å. No change in peak position with calcination temperature can be discerned.

Example 6

With reference to Example 1 and preparation of the present zirconia, the efficiency of ethanol extraction is demonstrated by:

(1) The weight loss of sample. For instance the mass of a sample decreased from 3 g to 1.2 g after extraction and drying at 110° C.

(2) The color change. After calcination in air at 300° C. the extracted sample is white; a non-extracted sample is brown and stays so even after calcination in air 400° C. for a long time.

(3) The wettability. The extracted sample is rapidly wetted by dilute sulfuric acid. Samples that were either incompletely extracted or not extracted at all, are not miscible with dilute sulfuric acid.

Example 7

Comparative Properties of mesoporous and microporous sulfated zirconia (MSZ1 unless otherwise indicated)

| Cal. T (°C.) | Small angle XRD | Large angle XRD | $S_{BET}$ (m²/g) | Vp(>10Å) (ml/g) | Rp (Å) |
|---|---|---|---|---|---|
| 110 | b,b | am | 290 | 0.28 | 18.8 |
| 400 | b,b | am | 211 | 0.26 | 18.6 |
| 500 | b,b | am | 175 | 0.22 | 18.7 |
| 550 |  | am | 215 | 0.16 | 18.4 |
| 600 | b,b | am + t | 110 | 0.23 | 18.5 |
| 650 |  | t + m(w) | 95 | 0.12 | 17.5 |
| 700 |  | t + m(w) | 91 | 0.12 | 18.7 |
| 750 |  | t + m(s) | 57 | 0.10 | >20 |
| 650(SZ) |  | t + m(w) | 117 | 0.20 | <15 |
| 650(MSZ2) |  | t + m(w) | 132 | 0.20 | >23.7 | s: strong; other band and crystal structure designations are as provided in Example 5.

The mesoporous, sulfated materials, MSZ1 and MSZ2, were prepared according to this invention and calcined (cal.) at the temperature (T, °C.) shown.

Example 8

The data of this example compares mesoporous and microporous sulfated zirconia as catalysts for n-butane isomerization after 2 min time on stream (Conversions are per 0.4 g of catalyst at 200° C., n-$C_4$/He(1%), 70 ml/min; MSZ1 unless otherwise indicated.)

| Cal. T (°C.) | Conv. (%) | S cont. (wt. %) | t-$ZrO_2$ cont.(g/g) | $S_{BET}$ (m²/g) | S'(Å²/$SO_4$) | STY (ml/g. min.) |
|---|---|---|---|---|---|---|
| 500 | 0.3 | 5 | 0 | 175 | 18.6 | 0.10 |
| 550 | 1.9 | 4.84 | 0 | 216 | 23.6 | 0.69 |
| 600 | 2.3 | 4.8 | 0.346 | 110 | 12.2 | 0.84 |
| 650 | 11.9 | 1.44 | 0.839 | 95 | 35.0 | 14.46 |
| 700 | 10.5 | 1.08 | 0.63 | 91 | 44.6 | 17.01 |
| 750 | 3.2 | 0.66 | 0.33 | 57 | 45.6 | 8.48 |
| 650(SZ) | 13.8 | 1.69 | 0.94 | 117 | 36.8 | 14.29 |
| 650 (MSZ2) | 9.1 | 1.64 | 0.682 | 132 | 42.8 | 9.71 |

While the principles of this invention have been described in connection with specific embodiments, it should be understood clearly that these descriptions, along with the chosen figures, charts and data therein, are made only by way of example and are not intended to limit the scope of this invention, in any manner. For example, the inventive zirconia materials have been shown as utilized with various reaction systems; however, and as would be well known to those skilled in the art made aware of this invention, this invention can be utilized with various other reaction systems. Likewise, while certain amine materials have been described herein, others, such as octylamine, decylamine, dodecylamine, tetradecylamine and octadecylamine can be used alone or in combination and with or without acetylacetone to achieve the same or similar affect. While various parameters, such as temperature of calcination, concentration of the stabilizing moiety, and time of reaction have been described in conjunction with the preparation of the zirconia materials, the same parameters can be varied in order to achieve maximum catalytic activity. Other advantages and features of this invention will become apparent from the following claims, with the scope thereof determined by the reasonable equivalents, as understood by those skilled in the art.

We claim:

1. A catalyst material, comprising:
    a zirconium dioxide particle with a mesoporous matrix, said mesopores having walls with a substantially tetragonal crystalline structure; and
    a stabilizing chemical moiety on the surface of said mesoporous matrix.

2. The catalyst material of claim 1 wherein said moiety is prepared from the reaction of said matrix with an ion selected from the group consisting of sulfur oxide, tungsten oxide, molybdenum oxide, yttrium oxide, chromium oxide, nickel oxide, cobalt oxide, copper oxide, vanadium oxide, iron oxide, manganese oxide, zinc oxide and a combination thereof.

3. The catalyst material of claim 1 wherein said moiety is the sulfation product of said matrix and sulfuric acid.

4. The catalyst material of claim 1 further including a metal supported by said matrix, said metal selected from the group consisting of platinum, palladium, rhodium, ruthenium and nickel.

5. The catalyst material of claim 1 wherein said mesopores have a diametral dimension of about 2 nm to about 5 nm.

6. The catalyst material of claim 5 wherein said mesopores have a monodisperse size distribution.

7. The catalyst material of claim 5 wherein said mesopores have a pore arrangement selected from the group consisting of regular and irregular arrangement.

8. The catalyst material of claim 5 wherein said moiety is prepared from the reaction of said matrix with an ion selected from the group consisting of sulfur oxide, tungsten oxide, molybdenum oxide, yttrium oxide, chromium oxide, nickel oxide, cobalt oxide, copper oxide, vanadium oxide, iron oxide, manganese oxide, zinc oxide and a combination thereof.

9. The catalyst material of claim 8 wherein said moiety is disposed on said surface of said mesoporous walls of said matrix.

10. A method of preparing particulate mesoporous zirconium dioxide having a tetragonal crystalline pore wall structure, said method comprising:
    providing an alkanolic solution of a zirconium alkoxide;
    combining said alkoxide solution with a mesopore template to form an insoluble solid;
    treating said solid with a mesopore stabilizing agent, wherein said agent is an oxide selected from the group consisting of a sulfur oxide, a transition metal oxide and a combination thereof; and
    calcining said solid.

11. The method of claims 10 further including acetylacetone in said alkanolic solution.

12. The method of claim 10 wherein said mesopore template is a $C_8$–$C_{18}$ alkylamine in water at a pH sufficient to homogeneously disperse said alkylamine in said water.

13. The method of claim 12 wherein the size of said mesopores is determined by the molecular dimension of the alkyl substituent of said alkylamine.

14. The method of claim 10 wherein said alkoxide is an anhydrous ethanolic solution of zirconium propoxide.

15. The method of claim 14 further including acetylacetone in said ethanolic solution.

16. The method of claim 14 further including ethanolic extraction of said insoluble solid before treatment with said stabilizing agent.

17. The method of claim 10 wherein said stabilizing agent is sulfuric acid.

18. The method of claim 10 wherein said stabilizing agent is at least one of tungsten oxide, molybdenum oxide and yttrium oxide, chromium oxide, nickel oxide, cobalt oxide, copper oxide, vanadium oxide, iron oxide, manganese oxide and zinc oxide.

19. The method of claim 10 wherein said solid is calcined at a temperature selected to provide a specific surface area and average pore volume of said mesoporous zirconium dioxide.

20. The method of claim 10 wherein said solid is calcined at a temperature reached at a rate of increase of about 0.5° C./min.

* * * * *

UNITED STATES PATENT AND TRADEMARK OFFICE
CERTIFICATE OF CORRECTION

PATENT NO. : 5,786,294
DATED : July 28, 1998
INVENTOR(S) : Sachtler et al.

It is certified that error appears in the above-identified patent and that said Letters Patent is hereby corrected as shown below:

Col. 13, Line 27: Omit "string" and insert --stirring--

Col. 16, Line 53: Omit "claims 10" and insert --claim 10--

Cover Page of Patent:

Other Publications, delete lines 4-6

Second column of Other Publications, Line 10: Omit "Catalysts" and insert --Catalyst--

Attorney, Agent or Firm: Omit "Meinhart" and insert --Reinhart--

Signed and Sealed this

Twenty-eighth Day of November, 2000

Attest:

Attesting Officer

Q. TODD DICKINSON

Director of Patents and Trademarks